United States Patent
Rentschler

(10) Patent No.: US 6,596,061 B1
(45) Date of Patent: *Jul. 22, 2003

(54) INORGANIC ANTI-CORROSIVE PIGMENTS AND METHOD FOR THE PRODUCTION THEREOF

(75) Inventor: Thomas Rentschler, Krefeld (DE)

(73) Assignee: Metallgesellschaft Aktiengesellschaft, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/763,366

(22) PCT Filed: Jun. 22, 1999

(86) PCT No.: PCT/EP99/04315

§ 371 (c)(1), (2), (4) Date: May 4, 2001

(87) PCT Pub. No.: WO00/11089

PCT Pub. Date: Mar. 2, 2000

(30) Foreign Application Priority Data

Aug. 21, 1998 (DE) .......................................... 198 37 956
Feb. 22, 1999 (DE) .......................................... 199 07 287

(51) Int. Cl.$^7$ ................................................ C09C 3/06
(52) U.S. Cl. ................................ 106/14.05; 106/14.12; 106/14.21; 106/401; 106/415; 106/416; 106/417; 106/418; 106/419; 106/420; 106/421; 106/422; 106/423; 106/425; 106/426; 106/427; 106/431; 106/461; 106/462; 106/482; 106/483; 106/486; 428/363; 428/403; 428/404

(58) Field of Search ........................... 106/14.05, 14.12, 106/14.21, 401, 415, 416, 417, 418, 419, 420, 421, 422, 423, 425, 426, 427, 431, 461, 462, 482, 483, 486; 428/363, 403, 404

(56) References Cited

U.S. PATENT DOCUMENTS

| | | | | |
|---|---|---|---|---|
| 3,926,660 A | * | 12/1975 | Holle et al. ................. | 106/430 |
| 4,479,891 A | * | 10/1984 | Kornmann et al. ......... | 252/512 |
| 5,114,486 A | * | 5/1992 | Demosthenous et al. ... | 106/443 |
| 5,123,965 A | * | 6/1992 | Herren et al. ............... | 106/462 |

FOREIGN PATENT DOCUMENTS

| | | | |
|---|---|---|---|
| DE | 1962492 | * | 7/1970 |
| EP | 0450805 | * | 10/1991 |
| FR | 2333033 | * | 6/1977 |

OTHER PUBLICATIONS

Chemical Abstracts, vol. 108, No. 12, abstract No. 96259 of Czech Patent No. 235887 (Mar. 1987).*

* cited by examiner

*Primary Examiner*—Anthony J. Green
(74) *Attorney, Agent, or Firm*—Antonelli, Terry, Stout & Kraus, LLP

(57) ABSTRACT

Inorganic anti-corrosive pigments consist of surface-coated solids having a grain size of 0.1 to 75 μm. In order to improve the resistance of the paints and coatings containing such pigments, firstly $Mn_3(PO_4)_2$ and secondly aluminium oxides and/or aluminium hydroxides are precipitated onto the solids.

25 Claims, No Drawings

INORGANIC ANTI-CORROSIVE PIGMENTS AND METHOD FOR THE PRODUCTION THEREOF

The invention relates to inorganic anti-corrosive pigments, consisting of surface-coated finely divided solids having a grain size of 0.1 to 75 μm, preferably 0.2 to 10 μm, a method for the preparation thereof and the use thereof.

Inorganic fillers are solids that are present in a finely divided form and which differ from inorganic white pigments on account of their refractive index. Fillers have, as a rule, refractive indices <1.7 (with respect to a vacuum), whilst white pigments have larger refractive indices. A further distinctive feature can be seen in the fact that these materials are used for filling purposes, that is, they represent a main constituent in the respective mixture. Pigments, on the other hand, are used mainly in small quantities. However, the two limiting criteria are not exact; on the one hand, a filler that has a refractive index of <1.7 can, in a suitably selected matrix, also have a certain covering capacity, that is, a property that is actually pigment-specific; on the other hand, certain fillers are also only used in small quantities. The dividing line is therefore blurred.

Fillers have two tasks; on the one hand they are to bring down the cost of a product in the conventional sense and ensure that, in comparison with products that are not filled, it has improved or additional, new properties, and on the other hand the use of fillers is often to facilitate the production of products.

In addition to the cost-lowering effect, fillers also have an influence upon the rheology, that is, thickening and, if applicable, thixotropy, bytmeans of controlled adjustment of a time-dependent structural viscosity, for example by means of talc, wollastonite and kaolin. In general, the flow behavior is to be affected in the case of lacquers, coatings, printing inks, liquid plastics materials and sealing compounds. The visual properties are also affected by fillers; for example the whiteness and covering capacity are improved when the true white pigment is replaced by inter alia synthetic silicates in disperse dyes. As a result of the use of mica, iron mica and barium sulphate fillers, it is possible to improve the corrosion protection of paints and coatings against the influences of weather and chemicals.

In CZ-B-235 851 inter alia fillers are provided that are covered with a layer of $Mn_3(PO_4)_2$ and with which lacquers are admixed for the purposes of protection against corrosion. JP-B-04 183 756 discloses a pigment that consists of sericite flakes the particles of which are covered with a layer of zinc oxide. The pigment particles are introduced into coatings for steel sheets to provide protection against corrosion. DE-C-2 200 654 deals with fillers, such as talc, silicon dioxide, titanium dioxide or mixtures thereof with a metal molybdate covering that is precipitated on the particle surfaces thereof. These particles are to be used as a corrosion-inhibiting additive in painting materials. According to U.S. Pat. No. 4,017,315, such a coating can additionally contain metal phosphate as well. EP-A-0 505 086 describes a method in which zinc phosphate is precipitated onto lamellar and flaky particles of synthetic iron oxide mica and these are introduced into coatings of steel components for protection against corrosion. In DE-C-2 245 995 a filler is proposed that is made from an inert core, consisting of wollastonite, talc, mica, nepheline-syenite and/or feldspar, the particle surfaces of which are covered with calcium phosphate, calcium phosphite and/or calcium borate.

This filler is to give paints and coatings an improved endurance strength and hardness, and also a corrosion-inhibiting effect and tannin-absorbing properties.

The specialist world is constantly endeavouring to make paints, coatings, printing inks or the like resistant to the influences of atmospheric substances and chemicals.

It is therefore the object of the present invention to make available anti-corrosive pigments of the kind described at the beginning which, in addition to the influences that they have on the rheological behavior and also on the,visual and mechanical properties of paints and coatings, have a clearly improved corrosion-inhibiting effect upon the resistance of paints and coatings.

This object is achieved by means of inorganic anti-corrosive pigments comprising surface-coated solids having a grain size of 0.1 to 75 μm, onto which firmly $Mn_3(PO_4)_2$ and secondly aluminum oxides and/or aluminum hydroxides are precipitated. More particularly, the surface-coated solids can have a grain size of 0.2 to 10 μm. In another aspect of the invention, $Mn_3(PO4)_2$ is replaced totally or partly by $Zn_3(PO_4)_2$. In addition, phosphates and/or oxides of cerium and/or hydroxides of tin can be precipitated individually or severally onto the solids. In that case, the proportions of the substance, weight-related to the solid, amount to 0.1 to 15% manganese, 0.1 to 15% zinc, 0.1 to 15% $Al_2O_3$, 0.1 to 5% $CeO_2$, and 0.1 to 10% $SnO_2$. More particularly, the proportions of the substances, weight-related to the solid, can amount to 0.1 to 3% manganese, 0.1 to 6% zinc, 0.1 to 6% $Al_2O_3$, 0.1 to 2.5% $CeO_2$, and 0.1 to 5% $SnO_2$.

The solids can be natural silicate fillers, in particular feldspar zeolites, talc, pyrophyllite, kaolin, mica, muscovite, bentonite, wollastonite and tremolite; barium sulphate fillers, in particular heavy spar and blanc fixe; zinc pigments, in particular zinc, zinc oxide, zinc sulphide and lithopones; iron mica; or aluminum oxide.

For preparing anti-corrosive pigments, the precipitation onto the surface of the solids is effected from an aqueous solution, in which are contained phosphorus compounds and soluble, inorganic and/or organic metal compounds firmly of aluminum and secondly of manganese and/or of zinc and, if applicable, thirdly of cerium and/or of tin, with the precipitation being effected in a plurality of stages in which the individual constituents are added.

The precipitation of the aluminum oxides and/or aluminum hydroxides can be effected from an aqueous solution in which alkali aluminates, aluminum sulphates, aluminum hydroxides and aluminum halides are used individually or severally as aluminum compounds. Alkali stannates and comparable organic salts can be used individually or severally as manganese-, zinc-, tin- and cerium-nitrates, carbonates, hydroxides, sulphates, halides, acetates, and oxalates. One or more of the compounds phosphoric acid, phosphorus pentoxide, alkali phosphate, alkali hydrogen phosphate, dihydrogen phosphate, pyrophosphate, triphosphate and polyphosphate can be used as a phosphorus compound.

The solids, which can consist of natural silicate- and barium-sulphate fillers, can be ground before surface coating is carried out. The precipitation of the surface coating is carried out continuously or discontinuously. The precipitation can be effected in a plurality of stages in succession or by means of simultaneous addition of a plurality of constituents. The precipitation of the aluminum compounds can be effected at the end.

The anti-corrosive pigments that are thus prepared can, after the surface coating has been carried out, be subjected to thermal after-treatment at temperatures of 400 to 1000° C., e.g., 600 to 900° C. The pigments can be ground up at the end of the preparation by means of pinned disk mills or jet mills.

The anti-corrosive pigments can be used with a base of aqueous or organic binding-agent systems that have solvents, in particular for priming, base-lacquering, finish-lacquering and the like, in, for example, automobile construction, railway construction, watercraft construction and aircraft construction and also for building protection. The anti-corrosive pigments can also be used for coatings, in particular for electrophoretic lacquers for cathodic or anodic dip lacquering.

The inorganic anti-corrosive pigments formed in accordance with the invention achieve, in particular, a clear increase in the resistance of lacquers, coatings and plastics materials to the influences of weather and chemicals.

The preparation of the anti-corrosive pigments in accordance with the invention is explained in greater detail in the following with reference to the example of a barium sulphate carrier material. The $BaSO_4$ that is used can not only be natural heavy spar, but also freshly precipitated synthetic $BaSO_4$ that has a different particle size and morphology.

An aqueous $BaSO_4$-suspension having a solids content of 21% $BaSO_4$ is heated to a temperature of 80° C. while subject to constant stirring. The pH values of the individual precipitation stages in the range of 4 to 8 are adjusted during the after-treatment, as required, by means of NaOH or $H_2SO_4$ and kept constant. The individual constituents—phosphoric acid and manganese sulphate solution and also subsequently sodium aluminate solution—are precipitated stoichiometrically onto the surface of the carrier material, in this case onto $BaSO_4$, in a multi-stage precipitation while subject to stirring and whilst maintaining pH and temperature. After a ripening time of approximately 2 hours while subject to constant stirring at a predetermined temperature, the resultant product is filtered off, washed with deionized water, dried and, in the case of a material that is as finely divided as possible, subsequently ground in a jet mill.

Grinding in a jet mill is inapplicable if small plate-like carrier materials are used. The product that is obtained can be subjected to an additional optional annealing process.

The anti-corrosive pigments in accordance with the invention can be prepared by means of these method measures, that is, with the selection of desired carrier materials and the fine-division or morphology thereof in combination with different, actively anti-corrosive surface coatings.

These anti-corrosive pigments are introduced into lacquer recipes in different pigment volume concentrations (PVC), that is, the ratio of the total volume of the anti-corrosive pigment in a product to the total volume of all the non-volatile constituents. An example of a solvent-based alkyd-coating system (data calculated in weight per cent as a solid) is reproduced in the following:

Alkyd resin (short-oily) 20%, phenolic resin 5%, $TiO_2$ 8%, anti-corrosive pigment 10%, heavy spar 6%, talc 8%, anti-skin forming agent (oxine) 0.4%, bentone 1%, desiccant 0.06%, remainder to give 100%: solvent xylene, glycols, butyl acetate. The proportions of the pigments and fillers can be varied according to the requirements.

The constituents in this case are mixed or pre-dispersed by means of a solubilises and subsequently dispersed by way of a continuous mill. In terms of application techniques, salt-spray mist tests according to DIN 51167, for example, can be carried out on this preparation by centrifuging the coating system onto degreased sheets, 100×150×1 mm, drying the latter and subsequently introducing them into special salt-spray mist chambers.

What is claimed is:

1. Inorganic anti-corrosive pigments, comprising solid particles having a grain size of 0.1 to 75 μm, a first precipitate selected from the group consisting of $Mn_3(PO_4)_2$, $Zn_3(PO_4)_2$ and mixtures thereof precipitated on the solid particles, and a second precipitate selected from the group consisting of aluminum oxides, aluminum hydroxides and mixtures thereof precipitated onto the solid particles.

2. Inorganic anti-corrosive pigments according to claim 1, wherein the solid particles have a grain size of 0.2 to 10 μm.

3. Anti-corrosive pigments according to claim 1 wherein said first precipitate comprises $Mn_3(PO_4)_2$.

4. Anti-corrosive pigments according to claim 1, further comprising at least one precipitate selected from the group consisting of phosphates and/or oxides of cerium and hydroxides of tin precipitated onto the solid particles.

5. Anti-corrosive pigments according to claim 4, wherein the precipitates are provided, weight-related to the solid, in amounts of 0.1 to 15% manganese 0.1 to 15% zinc 0.1 to 15% $Al_2O_3$ 0.1 to 5% $CeO_2$ 0.1 to 10% $SnO_2$.

6. Anti-corrosive pigments according to claim 5, wherein the precipitates are provided, weight-related to the solid, in amounts of 0.1 to 3% manganese 0.1 to 6% zinc 0.1 to 6% $Al_2O_3$ 0.1 to 2.5% $CeO_2$ 0.1 to 5% $SnO_2$.

7. Anti-corrosive pigments according to claim 1, wherein the solid particles are natural silicate fillers.

8. Anti-corrosive pigments according to claim 1, wherein the solid particles are barium sulphate fillers.

9. Anti-corrosive pigments according to claim 1, wherein solid particles are zinc pigments.

10. Anti-corrosive pigments according to claim 1, wherein the solid particles are iron mica.

11. Anti-corrosive pigments according to claim 1, wherein the solid particles are aluminium oxide.

12. Anti-corrosive pigments according to claim 7, wherein the natural silicate fillers are selected from the group consisting of feldspar zeolites, talc, pyrophyllite, kaolin, mica, muscovite, bentonite, wollastonite and tremolite.

13. Anti-corrosive pigments according to claim 8, wherein the barium sulphate fillers are selected from the group consisting of heavy spar and blanc fixe.

14. Anti-corrosive pigments according to claim 9, wherein the zinc pigments are selected from the group consisting of zinc, zinc oxide, zinc sulphide and lithopones.

15. Method for preparing anti-corrosive pigments comprising:

providing solid particles having a grain size of 0.1 to 75 μm; and precipitating a first precipitate selected from the group consisting of $Mn_3(PO_4)_2$, $Zn_3(PO_4)_2$ and mixtures thereof and a second precipitate selected from the group consisting of aluminum oxides, aluminum hydroxides and mixtures thereof onto the surface of the solid particles, from an aqueous solution in which phosphorus compounds and soluble, inorganic and/or organic metal compounds of aluminum and soluble, inorganic and/or organic metal compounds of manganese and/or of zinc are contained, with the precipitation being effected in a plurality of stages.

16. Method according to claim 15, wherein the precipation of the aluminium oxides and/or aluminium hydroxides is effected from an aqueous solution in which at least one aluminum compound selected from the group consisting of alkali aluminates, aluminium sulphates, aluminium hydroxides and aluminium halides is contained.

17. Method according claim 15, where in the soluble, inorganic and/or organic metal compounds of manganese and/or zinc are selected from the group consisting of nitrates, carbonates, hydroxides, sulphates, halides, acetates, and oxalates of manganese and/or zinc.

18. Method according to claim 15, wherein the phosphorous compounds are selected from the group consisting of the compounds phosphoric acid, phosphorus pentoxide, alkali phosphate, alkali hydrogen phosphate, dihydrogen phosphate, pyrophosphate, triphosphate and polyphosphate.

19. Method according to claim 15, wherein the solid particles comprise natural silicate- and barium-sulphate fillers that are ground before precipitation is carried out.

20. Method according to claim 15, wherein the precipitation is carried out continuously or discontinuously.

21. Method according to claim 15, wherein the precipitation of the aluminum compounds is effected last.

22. Method according claim 15 further comprising, after the precipitation has been carried out, subjecting the pigments to thermal after-treatment at temperatures of 400 to 1000° C.

23. Method according to claim 22, wherein the temperatures of the thermal after-treatment are at 600 to 900° C.

24. Method according to claim 15, further comprising grinding the pigments after precipitation by means of pinned disk mills or jet mills.

25. Method according to claim 15, further comprising precipitating at least one precipitate selected from the group consisting of phosphates and/or oxides of cerium and hydroxides of tin onto the solid particles.

* * * * *